Oct. 13, 1970   H. G. DE WINTER   3,533,696
LASER RANGE FINDER INCLUDING A LIGHT DIFFUSING ELEMENT
Filed July 8, 1966

INVENTOR
Hermanus Gerardus de Winter
BY
Arthur B. Colvin
ATTORNEY

# United States Patent Office 3,533,696
Patented Oct. 13, 1970

3,533,696
LASER RANGE FINDER INCLUDING A LIGHT DIFFUSING ELEMENT
Hermanus Gerardus de Winter, Enschede, Netherlands, assignor to N.V. Optische Industrie "De Oude Delft," Delft, Netherlands, a corporation of the Netherlands
Filed July 8, 1966, Ser. No. 563,764
Int. Cl. G01c *3/08*
U.S. Cl. 356—4
2 Claims

ABSTRACT OF THE DISCLOSURE

A laser range finder device in which a small sample of the pulsed light beam transmitted by the laser head is fed back to the receiver optics along an optical path including a light deffusing element.

---

Figure 1:
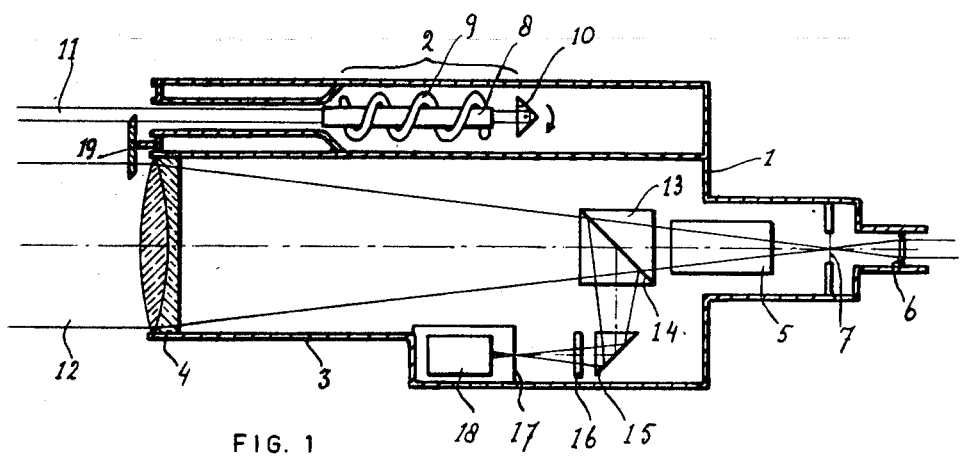

The invention relates to laser apparatus and, more particularly, to laser range finders and like devices which comprise a laser transmitter to transmit a pulsed beam of radiation toward a target, an optical objective system for receiving a beam of reflected laser radiation from such target and a detector for detecting such reflected radiation.

Devices of this kind form an important field of application for lasers. They may be used, e.g. in conjunction with suitable electronic counters to measure the time lapse between the transmittal of a pulse by the laser and the reception of a reflected pulse from the target whereby the distance to such target can be determined. In addition to range finders in the strict sense, e.g. optical radar systems fall into the category of apparatus to which the invention is applicable.

In order to accurately define the zero point of the time measurement a sample of the radiation pulse transmitted by the laser is directly fed to a radiation detector. The electric pulse thus generated may be used to start an electronic counter or utilized in any other manner according to the specific purpose of the device envisaged.

It has hitherto been common to provide a separate detector for generating the zero pulse and such detector is placed beside the laser beam and receives a fraction of the laser beam either from a small mirror projecting into the laser beam or from a wire grid which is positioned in front of the laser and scatters some of the radiation thereof into the direction of the zero pulse detector.

It is an object of this invention to provide simple means to guide a required amount of radiant energy from the laser beam to the detector detecting the radiation reflected by the target, so that the same is also utilized as zero pulse detector. It is a further object to provide such means which permits the amount of energy from the laser beam that is incident on the detector to be easily adjusted within wide limits. A still further object is to provide such means which does not require critical adjustments to ensure that a sample of the laser beam is incident on the detector.

In accordance with the invention, broadly, means are provided to diffuse a portion of the radiation of the pulsed beam transmitted and to make such diffused radiation incident on the optical objective system so that a sample thereof is detected by the same detector which detects the reflected radiation. In a preferred embodiment optically active surfaces are placed in the laser beam transmitted and in the reflected beam entering the optical objective system so that radiation from the laser beam transmitted is directed into the objective system via said surfaces, and at least one of these surfaces has radiation diffusing properties. More specifically, the surface in the laser beam transmitted may be a mirror reflective surface placed at an angle to the beam, axis, whereas the surface in the reflective beam is a diffusely reflective or diffusely transmissive surface. In order to permit adjustment of the intensity of the sample of radiation coupled back to the detector, the angle of any of such surfaces, or of both, relative to the respective beam axes may be made adjustable.

A particularly simple embodiment is achieved by providing a rod-like element of a material which is transparent to the laser radiation and one end of which projects into the laser beam transmitted and is so shaped that a portion of that beam enters the element and is guided thereby toward the other end of the element which projects into the reflected beam and has a diffusing exit surface for the radiation. Suitably, such element is a straight rod which is supported in a plane substantially perpendicular to the laser beam axis so as to be rotatably adjustable about its own axis, and has two beveled end faces one of which at least has radiation diffusing properties.

The radiation diffusing surface in the device according to the invention ensures that in all circumstances radiation from the laser beam will be incident on the optical receiver within the extremely small spatial angle from which radiation is passed on to the detector, without having to resort to delicate adjustments which other available means, such as mirors, would require. On the other hand it provides automatically the necessary weakening of the radiant energy before reaching the detector. Since the zero pulse and the echo pulse are both produced by the same detector and processed by the same electronic circuits, the intensities of the direct laser radiation and the reflected radiation on the detector should be in the same order and this may necessitate an attenuation of the laser beam by a factor of, e.g. $10^6$ to $10^8$. This is brought about by scattering almost all of the laser radiation picked up from the beam outside the small spatial angle which the optical receiver system passes on to the detector and which may be in the order of 1 milliradian. Furthermore, by adjusting the angular positions of the diffusing and/or reflective surfaces in the device described, their apparent area or their effectiveness in directing radiant energy toward the detector can be controlled with a view to varying within wide limits the amount of energy incident on the detector.

Figure 2:
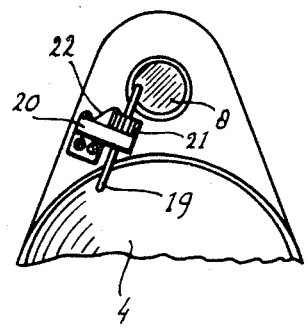
Figure 3:
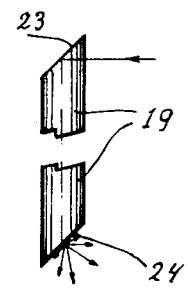

The drawing illustrates diagrammatically a preferred embodiment of a laser range finder constructed in accordance with the invention. In the drawings:

FIG. 1 shows the device in longitudinal cross section;
FIG. 2 shows a partial front view; and
FIG. 3 shows the coupling element of the device at a larger scale.

In FIG. 1, the housing 1 of the device has two compartments separated from each other by a light tight partition. In the upper compartment a laser device 2 is housed, whereas the lower compartment contains a telescope 3 diagrammatically shown as comprising an objective 4, a prism image inverting system 5 and an eye piece 6. The laser and telescope axes are parallel. In the focal plane of the eye piece a recticle 7 is provided to permit accurate sighting on a target the distance to which is to be measured.

The laser which generally will produce infrared radiation, has in the embodiment illustrated a ruby rod as its active medium, which is optically "pumped" by means of a helical flash lamp 9. High energy pulses of very short duration are generated by means of a roof prism 10 which borders the laser cavity on one side and can be rotated very fast by driving means not specifically shown in the drawing, a technique well-known in the art as Q-switching. The resulting pulsed beam of monochromatic coherent radiation 1 is concentrated in a very small spatial angle and is accurately parallel to the axis of the telescope 3.

A parallel beam 12 of radiation which has been reflected by the distant target is focused by the objective 4. In the convergent beam behind the objective a beam splitting prism 13 is positioned which is preferably provided with a dichroit surface 14 which, in well-known manner, is virtually transparent for visible light but selectively reflects infrared components of the incident radiation including the laser radiation toward a prism 15. Through a narrow pass-band filter 16 the laser radiation falls on a diaphragm or field stop 17 which is positioned in the plane of best focus and has a pin point aperture corresponding to the target point to which the laser beam has been directed. The radiation admitted by the aperture is detected by a photomultiplier 18. Whereas through the eye piece 6 the whole field of the telescope 3 may be observed the photomultiplier 18 receives only the reflected laser radiation from a small target in the center of such field.

To derive a starting or zero pulse for the time measurement a sample of the radiant energy of the laser beam 11 is coupled back to the photomultiplier 18 directly by means of a rod 19 of a material which is transparent to the laser radiation and which has one end projecting into the laser beam whereas the other end projects into the reflected beam 12. The manner in which the rod is mounted appears best from FIG. 2, whereas FIG. 3 shows the end portions of the rod on an enlarged scale.

The rod is cylindrical in shape and rotatably mounted in a hole of a support 20 attached to the instrument housing 1. A milled ring 21 fixed to the rod 19 facilitates its angular adjustment and a blade spring 22 maintains the rod in the selected position.

Both end surfaces of the rod 19 are beveled at 45° with the rod axis (FIG. 3). Surface 23 is optically polished flat and serves to deviate by total reflection incident radiation from the laser beam entering the rod through its cylindrical surface towards the exit surface 24. This latter surface has been made diffuse, e.g. by grinding, such that radiation reaching this surface is scattered in a wide spatial angle, as illustrated by the bundle of arrows in FIG. 3. Thus, an extremely small fraction only of this radiation will enter the objective 4 at such an angle as to be admitted by the pin hole of the field stop 17 to the detector 18. On the other hand, the rod need not be adjusted to any precision since the scattering at the diffusing surface 24 ensures that some of the laser radiation will in all circumstances be within the small field angle which the objective 4 focuses on the pin hole of field stop 17. The amount of energy actually incident on the detector can be easily adapted to the requirements of the detector and its related circuitry by rotating the rod 19. Thereby the angle at which the laser beam sees the surface 23 and hence the apparent effective area of this surface is varied, as well as the percentage of the radiation leaving the rod at surface 24 which eventually falls on the detector 18. The latter is true since, generally, the diffusion caused at surface 24 will not be such that the intensity of the resultant radiation is equal in all directions.

Many modifications may be applied to the apparatus shown and described without giving up its essential advantages and without leaving the domain of the invention in its broader aspects. As an example, it is within the scope of the invention to utilize separate small reflectors in the laser beam and in the reflected beam at angles with respect to the beam axes such that the reflector in the reflected beam receives some of the radiation deviated by the reflector in the laser beam. At least one of these reflectors may have diffusing properties, or a separate diffusing element, such as a ground glass, may be mounted in the optical path defined by the reflectors. Alternatively, a reflector in the laser beam may be omitted and a diffusing element of any kind, such as a grid, may be provided therein, in combination with a mirror in the reflected beam, to transmit some of the scattered radiation to the optical receiver. Preferably, in devices for military purposes it should be avoided, however, to use a diffusing element in the laser beam that scatters radiation in forward directions also, since this would facilitate detection of the range finders by enemy forces. Finally, it will be understood that a rod-like element like the one described, instead of being straight, could have curved end portions and light entrance an exit surfaces perpendicular to the beam axes of which at least one has light diffusing properties.

What I claim is:

1. In a laser range finding device comprising a laser transmitter to transmit a pulsed beam of radiant energy concentrated in a narrow spatial angle toward a target; an optical receiver including an objective for focusing a parallel beam of radiant energy reflected from said target in a focal plane, a pin hole field stop in said focal plane to discriminate between reflected radiant energy entering said objective within said narrow spatial angle and other radiation, and a detector disposed behind said field stop for detecting such reflected radiant energy; a mirror reflective surface placed in said transmitted pulsed beam at an oblique angle to the laser axis for deflecting a sample of said transmitted pulsed beam so as to become incident on said objective, and a diffusing surface placed in front of said objective at an angle to the objective axis, for optically diffusing said sample before entering said objective, whereby some of the radiant energy in said sample is projected by said objective on the pin hole of said field stop and received by said detector, the angle of at least one of said mirror reflective surface and said diffusing surface being adjustable.

2. The device defined in claim 1, wherein said mirror reflective surface and said diffusing surface are beveled end faces of a radiation transparent rod supported in a plane perpendicular to the laser axis and rotatably adjustable about its own axis.

References Cited

UNITED STATES PATENTS

| 2,577,815 | 12/1951 | Saunderson et al. | 88—14 |
| 3,150,363 | 9/1964 | Finvold. | |
| 3,373,441 | 3/1968 | Zadig. | |

OTHER REFERENCES

NEREM Record, 1962, session 3: Highlights of Army Communications and Electronics R&D. Nov. 5, 1962.

RONALD L. WIBERT, Primary Examiner

V. P. McGRAW, Assistant Examiner

U.S. Cl. X.R.

356—256